(No Model.)

G. STAPLES.
IMPLEMENT FOR PULVERIZING LUMPY GROUND.

No. 373,157. Patented Nov. 15, 1887.

Witnesses:
A. S. Clark
Chas. Semple

Inventor:
George Staples.
Per H. T. Willson.
his Attorney in fact.

UNITED STATES PATENT OFFICE.

GEORGE STAPLES, OF PITTSFIELD, OHIO.

IMPLEMENT FOR PULVERIZING LUMPY GROUND.

SPECIFICATION forming part of Letters Patent No. 373,157, dated November 15, 1887.

Application filed May 27, 1887. Serial No. 239,587. (No model.)

*To all whom it may concern:*

Be it known that I, GEORGE STAPLES, a citizen of the United States, residing at Pittsfield, in the county of Lorain and State of Ohio, have invented a new and useful Farm Implement for Pulverizing Lumpy Ground, of which the following is a specification.

My invention relates to improvements in implements for pulverizing lumpy ground; and it consists in the use of a crusher to which is hinged a harrow, which can be adjusted by a lever to any desired elevation or angle that may adapt it to the ground on which it is being used, and there be held rigidly in position.

The desired object is attained by the mechanism illustrated in the accompanying drawings, in which—

Figure 1:
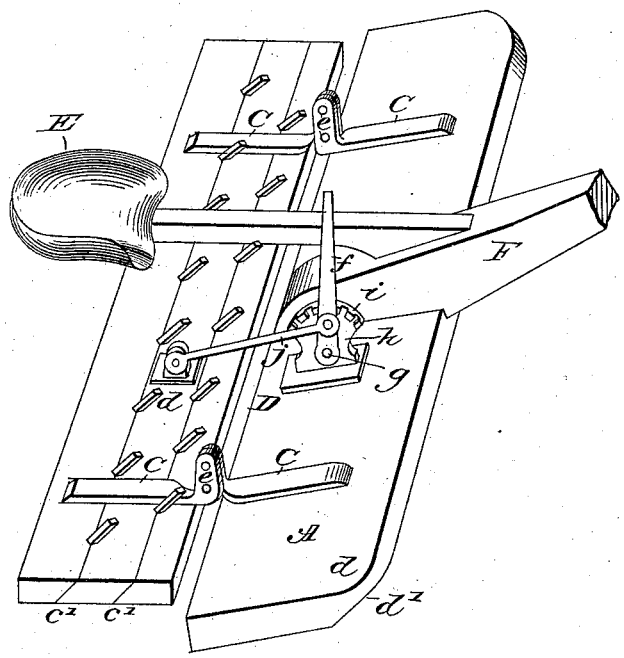
Figure 2:
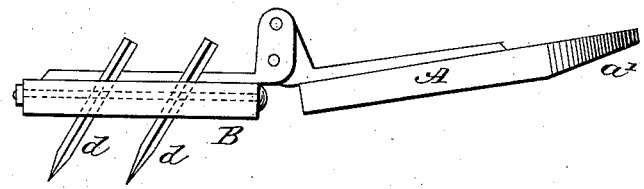

Figure 1 is a perspective view. Fig. 2 is an end elevation.

Similar letters refer to similar parts in both views.

In the drawings, A represents the crusher, which is ordinarily about seven feet long and sixteen inches wide. The forward corners are rounded off, as seen in Fig. 1 at $a$, and the front edge on the under side is chamfered, as seen at $a'$, Fig. 2.

B represents the harrow, which is constructed by bolting three planks together edgewise, the edges of which are cut diagonal, as seen at $c$. Between these diagonal edges the teeth $d$ are secured, as seen in Fig. 2.

C C represent hinges which secure the two sections of the implement together. Each hinge is provided with two sets of holes, $e$ $e$, through which a bolt can be inserted for the purpose of adjusting the height of the harrow in relation to the crusher as the requirements of the soil may demand. Thus, when the bolt is in the two upper holes, the harrow is level with the plane of the crusher; but when the lower hole of one coincides with the upper hole of the other side of the hinge, then the harrow is correspondingly higher or lower than the plane of the crusher.

D represents a device for the purpose of locking and holding in a rigid position in relation to each other the two sections A and B of the implement. $f$ is a lever, which is pivoted, as seen at $g$, to a stand, $h$. The upper portion of said stand $h$ forms a segmental clutch.

$j$ represents a connecting-rod, which is pivoted to the lever and also to the harrow, as seen in Fig. 1. When lever $f$ is drawn backward and locked, the rear edge of the harrow is correspondingly depressed, and by pressing said lever forward the rear edge of the harrow is elevated and held rigid in position.

E represents a seat for the operator, and F a portion of the pole, which is rigidly bolted to the upper surface of the crusher.

This implement is very effective in pulverizing and lightening up the surface of the ground, as by dragging the crusher over the surface every lump is effectually pulverized, and the harrow serves to stir and lighten up the soil. The implement being so narrow, it is enabled to effectually work into the dead furrows and all other depressed parts of the surface. The teeth, being set, as seen in Fig. 2, by being clamped between the plank, are easily lengthened or shortened, as may be desired, and they may be easily taken out and reversed so as to present a sharp point, caused by the natural wear. The crusher extends about one inch on each end beyond the harrow, so as to obviate the danger of injuring said harrow by striking or hitching onto stumps or other obstructions.

What I claim as new, and desire to secure by Letters Patent, is—

The crusher A, constructed as described, in combination with harrow B, adjustably hinged thereto, as described, said parts being held rigidly in relation to each other as adjusted at any desired angle of their planes by means of device D, consisting of lever $f$, clutch $i$, and connecting-rod $j$, all of the several parts being constructed and operating in the manner and for the purpose substantially as set forth.

GEORGE STAPLES.

Attest:
H. F. WILLSON,
GEO. H. CHAMBERLAIN.